(12) United States Patent
Ghoneim et al.

(10) Patent No.: US 9,506,445 B2
(45) Date of Patent: Nov. 29, 2016

(54) METHOD AND APPARATUS TO EVALUATE A STARTER MOTOR FOR AN INTERNAL COMBUSTION ENGINE

(71) Applicant: GM GLOBAL TECHNOLOGY OPERATIONS LLC, Detroit, MI (US)

(72) Inventors: Youssef A. Ghoneim, Rochester, MI (US); Mark N. Howell, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 262 days.

(21) Appl. No.: 14/168,059

(22) Filed: Jan. 30, 2014

(65) Prior Publication Data

US 2015/0211469 A1     Jul. 30, 2015

(51) Int. Cl.
*F02N 11/08*     (2006.01)
*F02N 11/10*     (2006.01)

(52) U.S. Cl.
CPC ......... *F02N 11/0825* (2013.01); *F02N 11/108* (2013.01); *F02N 11/087* (2013.01); *F02N 11/0814* (2013.01); *F02N 2200/022* (2013.01); *F02N 2200/04* (2013.01); *F02N 2200/043* (2013.01); *F02N 2200/044* (2013.01); *F02N 2200/062* (2013.01); *F02N 2200/063* (2013.01); *F02N 2200/064* (2013.01); *F02N 2200/0801* (2013.01)

(58) Field of Classification Search
CPC ........... F02N 11/0825; F02N 11/0814; F02N 11/108; F02N 11/087; F02N 2200/022; F02N 2200/043; F02N 2200/062; F02N 2200/064; F02N 2200/0801; F02N 2200/044; F02N 2200/063; F02N 2200/04; F02N 11/08; F02N 11/0859; F02N 11/0818
USPC ............. 701/113; 123/179.3, 179.4; 318/490
See application file for complete search history.

(56) References Cited

U.S. PATENT DOCUMENTS

| | | | |
|---|---|---|---|
| 7,743,649 B1 | 6/2010 | Salman et al. | |
| 8,055,460 B2 | 11/2011 | Rajagopalan et al. | |
| 8,234,036 B2 | 7/2012 | Shin et al. | |
| 2009/0309530 A1* | 12/2009 | Shin | F02N 11/0859 318/490 |
| 2013/0046435 A1 | 2/2013 | Shin et al. | |

FOREIGN PATENT DOCUMENTS

| | | | |
|---|---|---|---|
| DE | 102008037270 A1 | 3/2009 | |
| JP | 5149869 B2 * | 2/2013 | ......... F02N 11/0818 |

* cited by examiner

*Primary Examiner* — Stephen K Cronin
*Assistant Examiner* — Xiao Mo

(57) ABSTRACT

A method for monitoring the starter motor includes determining starter motor resistance associated with an engine starting event and determining a back-emf for the starter motor based upon the starter motor resistance. A state of health of the starter motor corresponding to the back-emf of the starter motor and engine cranking time is determined. Engine stop/start functionality is controlled based upon the state of health of the starter motor.

20 Claims, 4 Drawing Sheets

METHOD AND APPARATUS TO EVALUATE A STARTER MOTOR FOR AN INTERNAL COMBUSTION ENGINE

TECHNICAL FIELD

This disclosure is related to starting systems for internal combustion engines.

BACKGROUND

The statements in this section merely provide background information related to the present disclosure. Accordingly, such statements are not intended to constitute an admission of prior art.

Vehicle electrical systems including electric machines, e.g., motors and accessory drive devices that receive electric power from energy storage devices, are controlled by signals originating from control modules and other control devices and logic circuits. One electric circuit is a starting system that includes an electric-powered starter motor that spins an internal combustion engine when activated with an ignition switch. A fault in a starting system may cause an engine crank fault that results in an engine non-start event.

SUMMARY

A method for monitoring the starter motor includes determining starter motor resistance associated with an engine starting event and determining a back-emf for the starter motor based upon the starter motor resistance. A state of health of the starter motor corresponding to the back-emf of the starter motor and engine cranking time is determined. Engine stop/start functionality is controlled based upon the state of health of the starter motor.

BRIEF DESCRIPTION OF THE DRAWINGS

One or more embodiments will now be described, by way of example, with reference to the accompanying drawings, in which.

DETAILED DESCRIPTION

Figure 1:
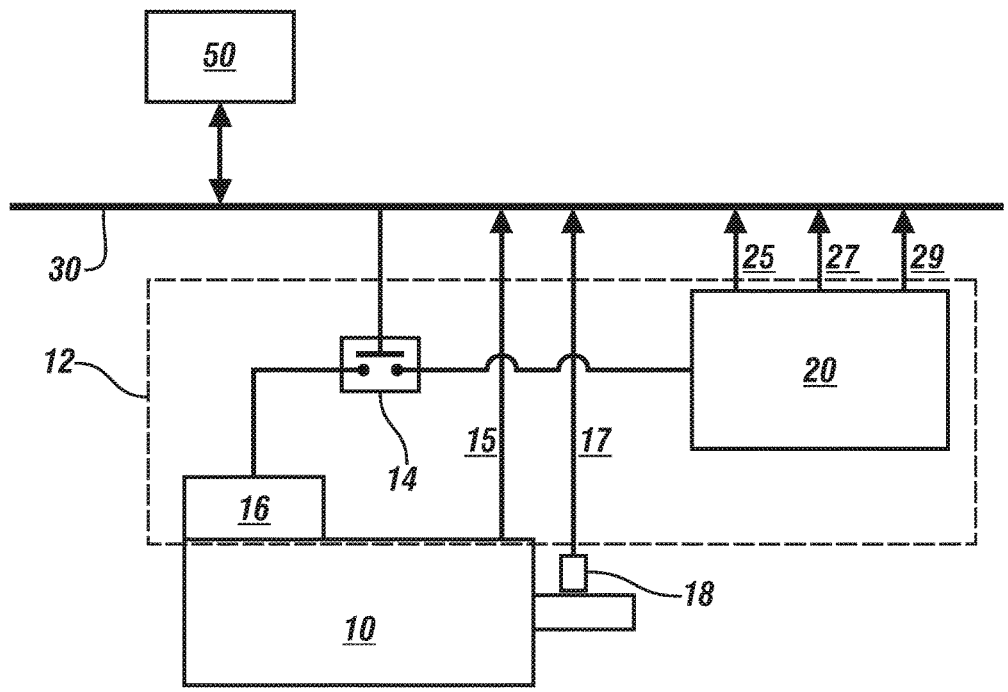
FIG. 1 illustrates an exemplary internal combustion engine including a starting system and a control system, in accordance with the disclosure.

Referring now to the drawings, wherein the showings are for the purpose of illustrating certain exemplary embodiments only and not for the purpose of limiting the same, FIG. 1 schematically shows an internal combustion engine 10 including a starting system 12 and a control system 50. The starting system 12 preferably includes an engine starter motor 16, a starter switch 14 and a battery 20. In one embodiment the internal combustion engine 10 is an element of a powertrain system that is employed on a vehicle. The starting system 12 is configured to execute engine stop/start functions during ongoing vehicle operation. The engine 10 and starting system 12 include any internal combustion engine employing a starting system that is configured to execute engine starting events related to engine stop/start functions during ongoing vehicle operation. Information transfer to and from the control system 50 may be accomplished using one or more communications paths, e.g., communications bus 30, which may include one or more of a direct connection, a local area network bus, and a serial peripheral interface bus.

The engine 10 is equipped with a plurality of actuators and sensing devices for monitoring operation and delivering fuel to form a combustion charge to produce torque that is responsive to an operator torque request. In one embodiment, the engine 10 is a spark-ignition engine configured to operate as a spark-ignition combustion mode with combustion controlled by a spark ignition system, and may include operation in a homogeneous charge spark-ignition combustion mode. Alternatively, the engine 10 may be a compression-ignition engine configured to operate in a compression-ignition combustion mode with combustion controlled by timing of injected fuel. Engine actuators preferably include fuel injectors, air flow controllers, spark-ignition systems on engines so equipped, and other devices associated with controlling engine operation to control the aforementioned engine states. Engine sensing devices preferably include a coolant temperature sensor or other device for monitoring engine temperature 15 and a crankshaft position sensor 18 configured to monitor rotational speed 17 of the engine 10.

The battery 20 may be any electrical energy storage device, and in one embodiment is a multi-celled low-voltage lead-acid battery, e.g., a 12V battery. Operating parameters of the battery 20 include battery temperature 25, battery voltage 27 and battery current 29. The battery operating parameters can be directly monitored, estimated, or otherwise determined during ongoing system operation.

The starter motor 16 may include any engine cranking device, and is a permanent-magnet DC electric motor with an attached starter solenoid in one embodiment. In such an embodiment, a rotatable shaft of the starter motor 16 includes a moveable drive pinion gear that is configured to meshingly engage a starter ring gear attached to a crankshaft of the engine 10 when the starter solenoid is activated during a starting event. When the starter switch 14 is activated, electric current is supplied to the starter solenoid to cause the moveable drive pinion gear to meshingly engage the starter ring gear attached to the crankshaft of the engine 10 and supply electric current to spin the starter motor 16, thus spinning the engine 10. In one embodiment, the starter motor 16 is configured to effect engine starting while the engine is spinning in an unfueled state. Such a configuration may include a starter employing two solenoid devices, including a first solenoid to spin the starter motor and a second solenoid to activate a moveable drive pinion gear to meshingly engage a starter ring gear coupled to the engine crankshaft. Such a configuration permits an engine starting sequence that includes spinning the starter motor to synchronize speeds with the engine and activating the moveable drive pinion gear when the speeds are synchronized.

The controller 50 initiates an engine starting event by communicating an engine start signal to activate the starter switch 14, which is configured to electrically connect the engine starter motor 16 to the battery 20. An engine starting event can be initiated in response to an operator key-on command or in response to an engine autostart command that is a part of the engine stop/start function. The control system 50 is configured to control operation of the engine 10 during each starting event. An engine starting event includes activating an engine starter while coincidently controlling engine fueling and spark on spark-ignition engines. Each starting event preferably includes a command to start the engine 10 wherein the starter switch 14 is activated to electrically connect the starter motor 16 to the battery 20, causing the starter motor 16 to spin. The control system 50 coincidently controls engine fueling and spark on spark-ignition engines to start the engine 10 by executing other engine control functions related to fueling and firing the engine 10.

The controller 50 executes the engine stop/start function to automatically stop (autostop) and automatically restart (autostart) engine operation during ongoing vehicle operation in response to operator commands and on-vehicle demands. By way of example, an autostop command may be executed to achieve an engine OFF state when a vehicle is in a stopped condition, such as waiting at a traffic light. An autostart engine starting event is executed in response to a command from the control system 50 to activate the starter switch 14, for example subsequent to an autostop command during ongoing vehicle operation. The engine can execute a starting event to operate in an engine ON state in response to an autostart command caused by an operator action such as depressing an accelerator pedal. The stop/start function may provide benefits of improved fuel efficiency and/or reduced emissions.

The engine speed may be at 0 RPM, i.e., in an OFF state and not rotating prior to initiating a starting event. Alternatively, the engine may be spinning at a low speed in an unfueled condition prior to initiating the starting event. This can include vehicle operation wherein the vehicle is presently moving during the starting event. A key-on engine starting event is executed in response to an operator key-on command to the starter switch 14, for example when an operator first enters a vehicle to begin a trip. It is appreciated that a key-on engine starting event includes operator-initiated remote-start events and other similar operations.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, example each 100 microseconds, 3.125, 6.25, 12.5, 25 and 100 milliseconds during ongoing engine and vehicle operation. Alternatively, routines may be executed in response to occurrence of an event.

Figure 2:
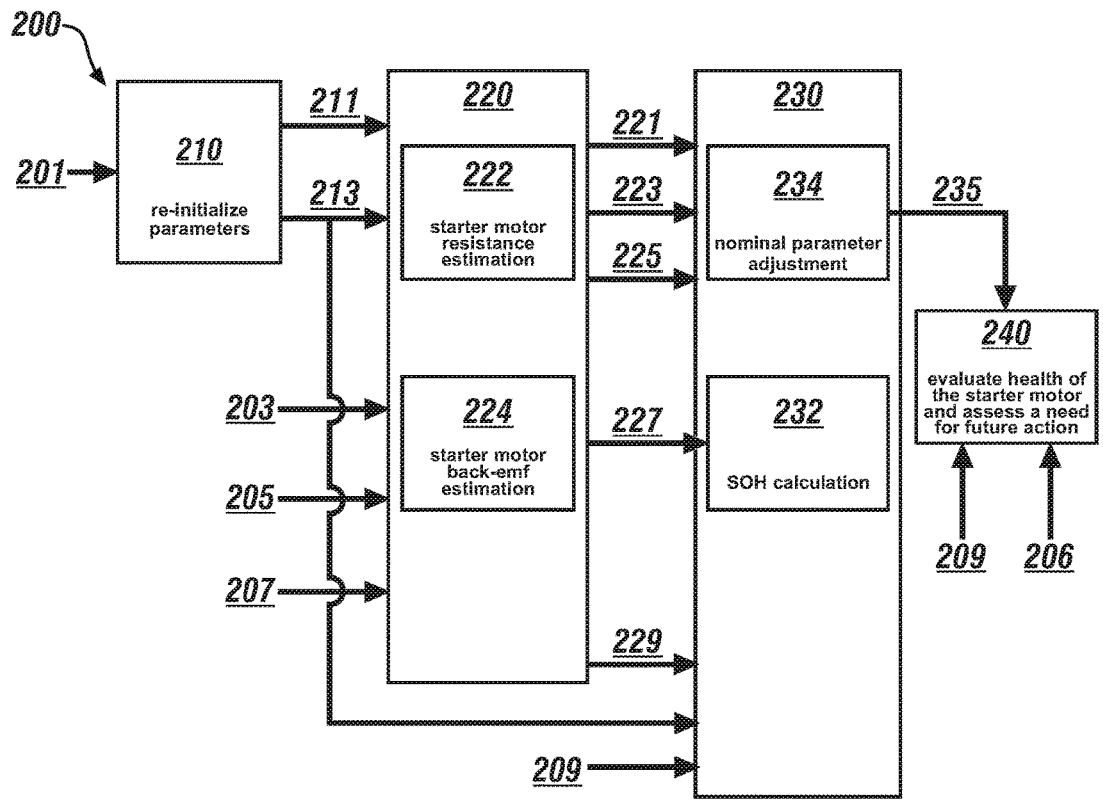
FIG. 2 illustrates a starter motor state-of-health (SOH) monitoring scheme configured to evaluate a starter motor of an internal combustion engine, in accordance with the disclosure.

FIG. 2 schematically shows a starter motor state-of-health (SOH) monitoring scheme (monitoring scheme) 200 configured to evaluate a starter motor of an internal combustion engine, an embodiment of which is described with reference to FIG. 1. SOH is a parameterized indicator of remaining useful life of a device or system, preferably expressed as a percentage of total life of the device or system. A starter motor SOH is a parameterized indicator of SOH of the starter motor. The monitoring scheme 200 determines motor resistance and back-emf during a starting event based upon monitored parameters, and determines a starter motor SOH based upon the motor resistance and the back-emf, taking into account other factors related to engine, vehicle, and ambient conditions. The starter motor SOH can be employed to decide whether to permit subsequent engine stop/start events during ongoing vehicle operation.

Preferred operating parameters for the starting system that are monitored during each starting event include a crank signal 201, battery voltage ($V_{bat}$) 203, battery current ($I_{bat}$) 205, vehicle speed 206, engine speed ($N_{en}$) 207, and a transmission range selector (PRNDL) 209. The operating parameters can be directly monitored using on-board sensors, inferred from information obtained from other sensors, estimated or otherwise determined using models reduced to routines and implemented in a controller.

The monitoring scheme 200 is initiated when the crank signal 201 indicates engine cranking is active, i.e., an engine starting event is occurring. Initiating the monitoring scheme 200 includes determining trigger and reset signals (210) in response to the crank signal 201 to re-initialize parameters each time the engine starts during an engine stop/start event. This includes setting a trigger signal T 211 to T(t)=1 in response to the crank signal 201 and setting a reset signal R 213 to R=max [0, (T(t)−T(t−1))], wherein (t) indicates a presently occurring starting event and (t−1) indicates a previous starting event.

The trigger signal T 211 and reset signal R 213 are employed to initiate monitoring and tracking states of the battery voltage 203, battery current 205, and engine speed 207, which are employed in a second scheme 220 that includes a starter motor resistance estimation scheme 222 and a starter motor back-emf estimation scheme 224.

The starter motor resistance estimation scheme 222 includes estimating the starter motor resistance when the electrical current spikes at its peak value during a starting event, which coincides with the voltage reaching its minimum value. At the same time, the engine speed has not been developed. The estimated resistance for the starting event is calculated in accordance with the following relationship:

$$\hat{R}_e = \frac{V_{min}}{I_p} \quad [1]$$

wherein $\hat{R}_e$ is the estimated starter motor resistance for the starting event, $V_{min}$ is the minimum starter voltage during the starting event, and $I_p$ is the peak starter current during the starting event.

Figure 3:
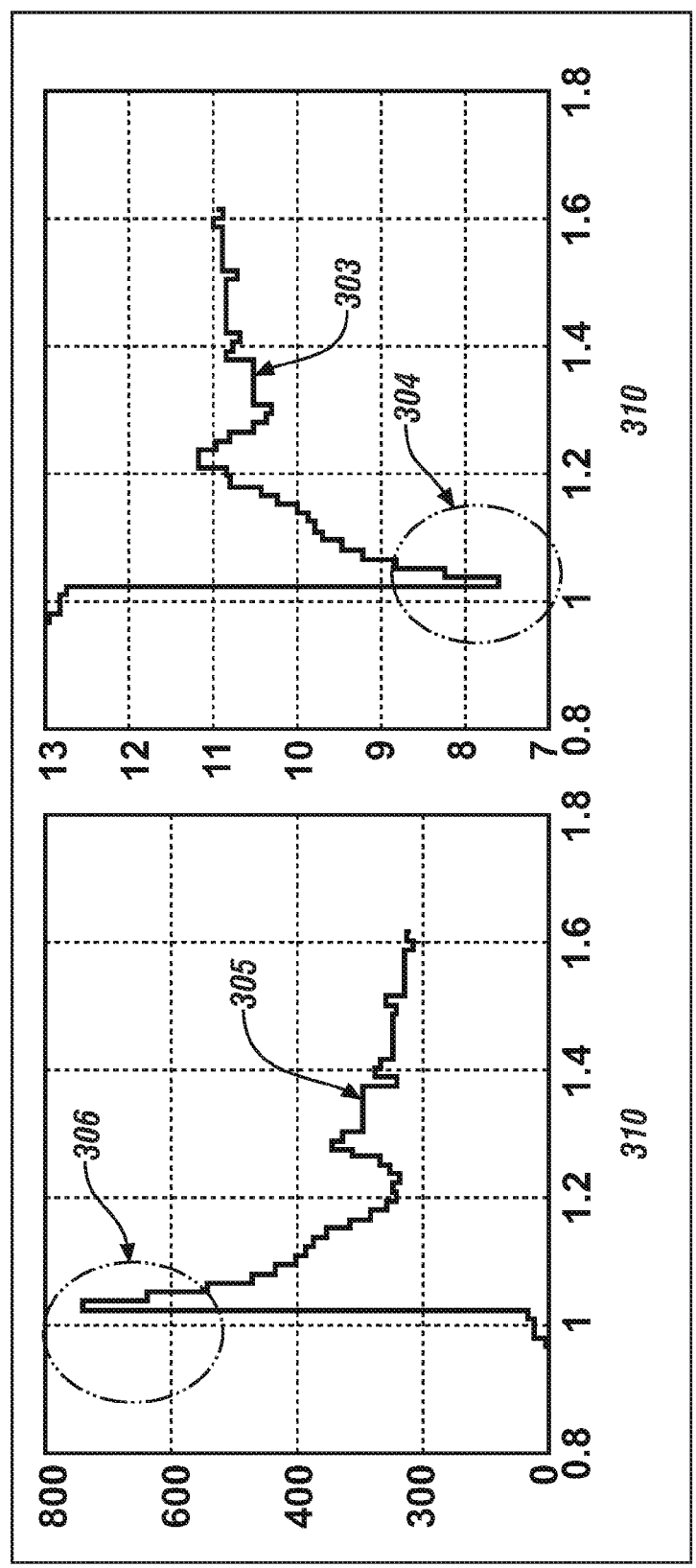
FIG. 3 illustrates time-coincident data associated with engine cranking during an engine starting event for a representative engine, including starter motor current and starter motor voltage in relation to time, in accordance with the disclosure.

FIG. 3 graphically shows time-coincident data associated with engine cranking during an engine starting event for a representative engine, including the starter motor current 305 and starter motor voltage 303 in relation to time 310 shown on the horizontal axis. A peak starter motor current ($I_p$) 306 and corresponding minimum starter voltage $V_{min}$ 304 are indicated on the datagraphs.

The starter motor back-emf estimation scheme 224 employs the estimated starter motor resistance $\hat{R}_e$ to estimate back-emf $K_e$. This includes defining a regression model y(t) in accordance with the following relationships:

$$y(t) = \phi(t)\theta = V_B(t) - I_B\hat{R}_e$$

$$\phi(t) = N_{spd}, \theta = K_e \quad [2]$$

wherein $V_B(t)$ is battery voltage for the present iteration, $I_B$ is battery current, $\hat{R}_e$ is the estimated starter motor resistance for the starting event, $N_{spd}$ is rotational speed of the starter motor, and $K_e$ is the estimated back-emf.

Figure 4:
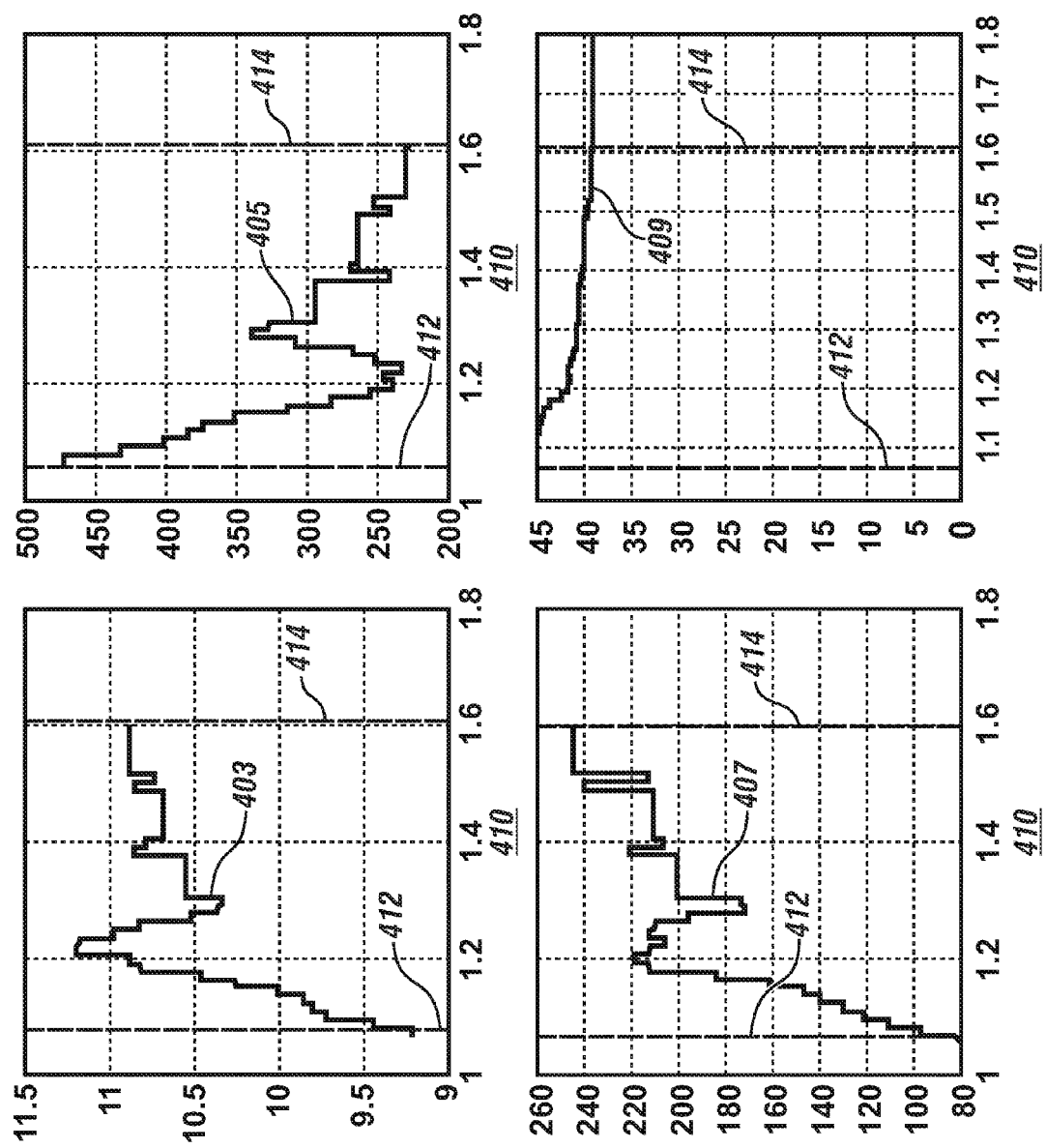
FIG. 4 illustrates time-coincident data associated with engine cranking during a starting event, including battery voltage $V_B(t)$, battery current $I_B$, engine speed N and estimated back-emf $K_e$ in relation to time, in accordance with the disclosure.

A least-squares estimation routine can be applied to estimate the back-emf for battery currents and battery voltages measured during an engine starting event over a range of engine speeds between a minimum engine speed and a maximum engine speed. Estimation of the back-emf $K_e$ based upon data measured during an engine starting event is shown with reference to FIG. 4, which graphically shows time-coincident data associated with engine cranking during a starting event. The time-coincident data includes the battery voltage $V_B(t)$ 403, battery current $I_B$ 405, engine speed N 407 and the estimated back-emf $K_e$ 409 in relation to time shown on the horizontal axis 410. A minimum engine speed is shown at time T1 412 and a maximum engine speed is shown at time T2 414. As shown, the estimated back-emf $K_e$ 409 converges to a value using the least-squares estimation routine.

A starter motor determination scheme 230 employs a SOH calculation scheme 232 and a nominal parameter adjustment scheme 234 to determine starter motor SOH 235. The SOH calculation scheme 232 and the nominal parameter adjustment scheme 234 employ the estimated starter motor resistance $\hat{R}_e$ 221, the peak starter current $I_p$ 223, the estimated back-emf $K_e$ 225 to adjust a nominal SOH based upon engine cranking time $C_{time}$ 227 and starter motor temperature $T_{SM}$ 229 in response to the reset signal R 213 taking into account other factors related to engine, vehicle, and ambient conditions as described herein. Nominal starter motor operating parameters including cranking time and back-emf are associated with operation of a new or recently broken-in starter motor that is fabricated in accordance with all manufacturer's specification and operating at standard conditions for temperature and pressure. The cranking time is specific to an engine on which it is employed, and thus cranking time referred to herein describes engine cranking time. The starter motor SOH can be determined based upon the estimated starter motor resistance for the starting event compared to a nominal starter motor resistance and the estimated back-emf compared to the nominal back-emf, wherein the nominal starter motor resistance and the nominal back-emf are adjusted to account for variations caused by temperature deviation from a nominal starter motor temperature.

The nominal starter motor resistance and the nominal back-emf are adjusted for starter motor temperature $T_{SM}$ in accordance with the following relationships:

$$R_{adj\_nom}(T_{SM}) = R_{nom}(1 + \rho(T_{SM} - T_0))$$

$$K_{e\_adj\_nom}(T_{SM}) K_{e\_nom}(1 - \beta(T_{SM} - T_0)) \quad [3]$$

wherein $R_{adj\_nom}(T_{SM})$ is the nominal starter motor resistance at starter motor temperature $T_{SM}$ for a functional starter motor, $R_{nom}$ is a nominal resistance at nominal temperature $T_0$ for a functional starter motor that is built in accordance with manufacturer's specifications, $K_{e\_nom}$ is the nominal back-emf at nominal temperature $T_0$ for the functional starter motor, $K_{e\_adj\_nom}(T_{SM})$ is the nominal back-emf at starter motor temperature $T_{SM}$ for the functional starter motor, $\rho = 0.00393/°$ C. for copper magnet wire, and is a temperature-based resistivity coefficient, and $\beta = 0.002/°$ C. for ferrite material, and is a temperature-based emf coefficient.

The nominal back-emf can be adjusted based upon the nominal starter motor resistance that has been adjusted for starter motor temperature $T_{SM}$. The nominal and temperature-adjusted states for the starter motor resistance, the estimated starter motor resistance $\hat{R}_e$ and the estimated back-emf $K_e$ are employed to determine a start/stop function availability SOH ($SOH_{start\_stop\_avail}$) and a fault detection SOH ($SOH_{fault\_detection}$) in accordance with the following relationships.

$$SOH_{start\_stop\_avail} = \min\left[\frac{\min(R_{nom}, \hat{R}_e)}{\max(R_{nom}, \hat{R}_e)}, \frac{K_e}{K_{e\_nom}}\right] \quad [4]$$

$$SOH_{fault\_detection} = \min\left[\frac{\min(R_{adj\_nom}, \hat{R}_e)}{\max(R_{adj\_nom}, \hat{R}_e)}, \frac{K_e}{K_{e\_adj\_nom}}\right] \quad [5]$$

A finalized starter motor SOH can be determined based upon a minimum value of the start/stop function availability SOH and the fault detection SOH that has been adjusted based upon a ratio of nominal cranking time $C_{time\_nom}$ and the measured cranking time $C_{time}$, as shown in the following relationship:

$$SOH = \min(SOH_{start\_stop\_avail}, SOH_{fault\_detection}) \frac{C_{time\_nom}}{C_{time}} \quad [6]$$

wherein $C_{time}$ is the measured cranking time, and $C_{time\_nom}$ is the nominal cranking time, which is a nominal operator crank time to start the engine when the transmission range selector is in Park, and a nominal stop/start crank time when the transmission range selector is another transmission range.

Referring again to FIG. 2, the starter motor SOH term 235 determined in accordance with EQS. 4, 5 and 6 can be employed in a decision block 240 to evaluate health of the starter motor and assess a need for future action. This includes employing the SOH 235, the vehicle speed 206 and transmission range selector (PRNDL) 209 in the starter motor monitoring scheme 500 of FIG. 5.

When operation of the starter motor 14 is within manufacturer specifications with adjustments for variation in the operating temperature, the SOH term determined with reference to EQS. 4, 5 and 6 is at or near 100%. Degradation in components and physical and electrical connections in the starter motor due to thermal cycling, contamination, wear and other factors may cause deterioration in the calculated SOH term. Threshold SOH levels can be determined that are associated with minimum acceptable levels of performance for an engine starting event, and employed in the starter motor monitoring of FIG. 5.

Figure 5:
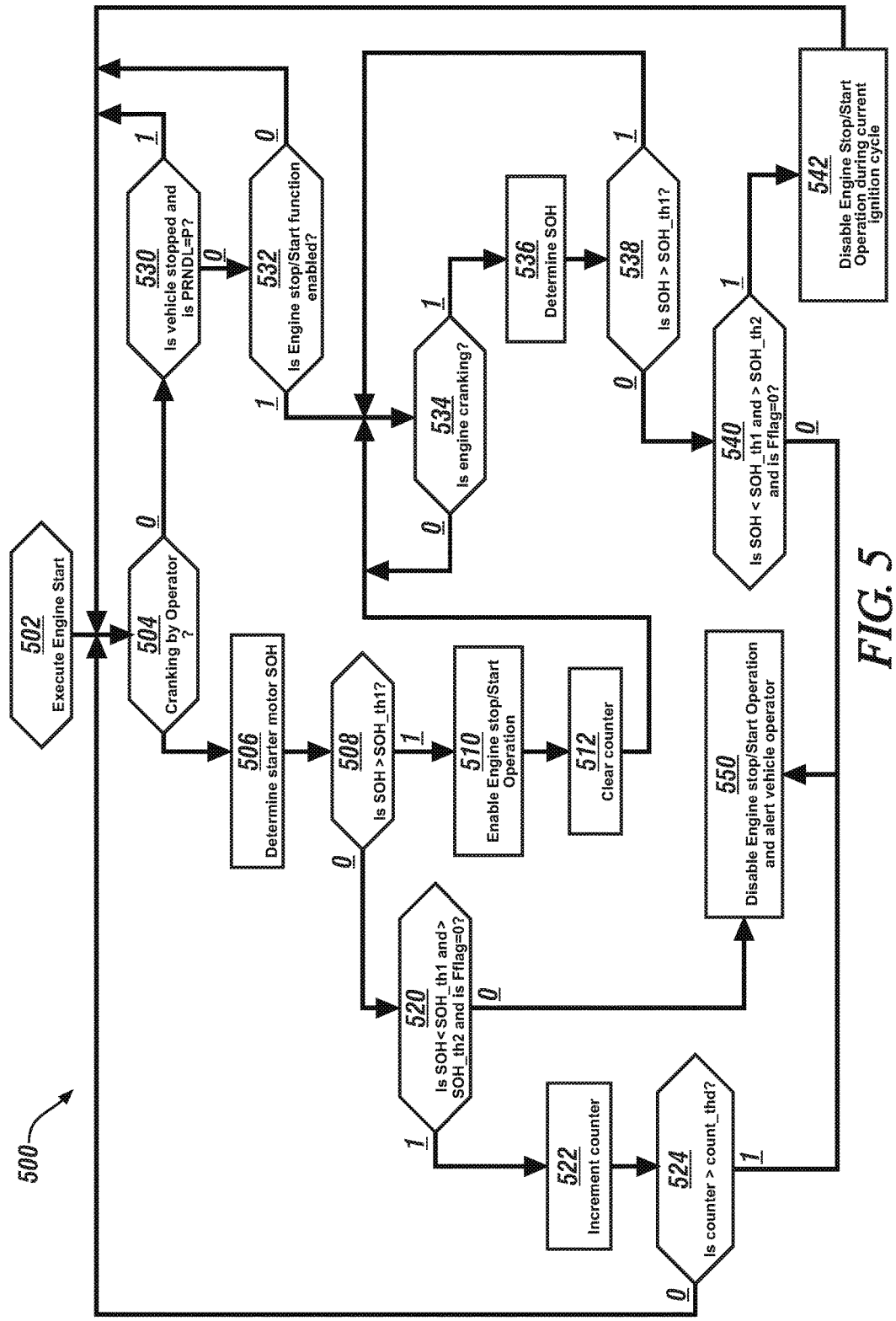
FIG. 5 illustrates a starter motor monitoring scheme in flowchart form for evaluating a starter motor for an internal combustion engine, in accordance with the disclosure.

FIG. 5 schematically depicts an embodiment of the starter motor monitoring scheme 500 in flowchart form for evaluating SOH of a starter motor for an internal combustion engine, e.g., an embodiment of the starting system 12 and the engine 10 described with reference to FIG. 1. The starter motor monitoring scheme 500 is preferably executed in the control module 50 as one or more routines and associated calibrations, and includes a two-step parameter estimation of physical parameters of the starter motor, including a peak starting voltage-based estimation of starter motor resistance, which is employed to estimate a back-emf for the starter motor. The starter motor resistance and the back-emf are employed to determine SOH states, which are employed as part of starter motor monitoring to determine availability of engine stop/start functionality. The method embodied in the starter motor monitoring scheme 500 is executed to monitor a starter motor during an engine starting event to detect a fault associated with the starter motor 16 while monitoring available parameters including engine rotational speed, cranking voltage and cranking time. As described herein, the starter motor monitoring scheme 500 evaluates the starting system 12 described with reference to FIG. 1 by monitoring engine speed, time, and battery voltage during engine cranking without a need for additional sensing systems. Table 1 is provided as a key wherein the numerically labeled blocks and the corresponding functions are set forth as follows.

TABLE 1

FIG. 5

| BLOCK | BLOCK CONTENTS |
|---|---|
| 502 | Execute Engine Start |
| 504 | Cranking by Operator? |
| 506 | Determine starter motor SOH |
| 508 | Is SOH > SOH_th1? |
| 510 | Enable Engine stop/Start Operation |
| 512 | Clear counter |
| 520 | Is SOH < SOH_th1 and > SOH_th2 and is $F_{flag} = 0$? |
| 522 | Increment counter |
| 524 | Is counter > count_thd? |
| 530 | Is vehicle stopped and is PRNDL = P? |
| 532 | Is Engine stop/Start function enabled? |
| 534 | Is engine cranking? |
| 536 | Determine SOH |
| 538 | Is SOH > SOH_th1? |
| 540 | Is SOH < SOH_th1 and > SOH_th2 and is $F_{flag} = 0$? |
| 542 | Disable Engine Stop/Start Operation during current ignition cycle |
| 550 | Disable Engine stop/Start Operation and alert vehicle operator |

During each vehicle key-on event (502), starter motor monitoring scheme 500 initiates operation by initially determining whether engine cranking has been initiated by a vehicle operator, e.g., in the form of a key-on event, a remote start event, or another operator-initiated action (504). When the vehicle operator has initiated the engine cranking (504)(1), a starter motor SOH is determined (506), preferably executing routines that employ executable forms of EQS. 1 through 6. The starter motor SOH is compared to a first threshold SOH (SOH>SOH_th1?) (508). When the starter motor SOH is greater than the first threshold SOH (508)(1), the engine stop/start function is enabled for the present key-on event (510), including clearing a fault counter (512).

When the starter motor SOH is less than the first threshold SOH (508)(0), the starter motor SOH is compared to a second SOH threshold (SOH>SOH_th2?) and whether a fault flag has been set ($F_{flag}=0$?) (520). When either the starter motor SOH is less than the second SOH threshold or a fault flag has been previously set (520)(0), the engine stop/start function is disabled and the vehicle operator is alerted (550). When the starter motor SOH is greater than the second SOH threshold and no fault flag has been previously set (520)(1), a fault counter is incremented (522) and the fault counter is compared to a threshold count (524). When the fault counter is less than the threshold count (524)(0), the starter motor monitoring scheme 500 re-initiates execution (504). When the fault counter is greater than the threshold count (524)(1), the engine stop/start function is disabled and the vehicle operator is alerted (550).

When the vehicle operator has not initiated the engine cranking (504)(0), it is determined whether the vehicle is stopped with the transmission range selector in the Park position (530). If so (530)(1), the starter motor monitoring scheme 500 re-initiates execution (504). If not (530)(0), it is determined whether the engine stop/start function is enabled (532). If not (532)(0), the starter motor monitoring scheme 500 re-initiates execution (504).

When the engine stop/start function is enabled (532)(1) during each key-on event the starter motor monitoring scheme 500 monitors to detect engine cranking that is initiated by the engine stop/start function (534). When engine cranking is initiated by the engine stop/start function (534)(1) the starter motor SOH is determined (536), preferably executing routines that employ executable forms of EQS. 1 through 6. The starter motor SOH is compared to a first threshold SOH (SOH>SOH_th1?) (538). When the starter motor SOH is greater than the first threshold SOH (538)(1), the engine stop/start function continues to be enabled for the present key-on event, and execution of the starter motor monitoring scheme 500 awaits another iteration of engine cranking to re-initiate monitoring.

When the starter motor SOH is less than the first threshold SOH (538)(0), the starter motor SOH is compared to a second SOH threshold (SOH>SOH_th2?) and whether a fault flag has been set ($F_{flag}=0$?) (540). When either the starter motor SOH is less than the second SOH threshold or a fault flag has been previously set (540)(0), the engine stop/start function is disabled and the vehicle operator is alerted (550). When the starter motor SOH is greater than the second SOH threshold and no fault flag has been previously set (540)(1), the starter motor monitoring scheme 500 disables the engine stop/start function for the present ignition cycle (542). In this manner, starter motor SOH is evaluated during an engine starting event to detect a fault associated with the starter motor.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for monitoring an electrically-powered starter motor for a starter of an internal combustion engine, comprising:
   determining a starter motor resistance associated with an engine starting event;
   determining a back-emf for the starter motor based upon the starter motor resistance;
   determining a state of health (SOH) of the starter motor corresponding to the back-emf of the starter motor and a measured engine cranking time; and controlling engine stop/start functionality based upon the SOH of the starter motor.

2. The method of claim 1, wherein determining the back-emf for the starter motor based upon the starter motor resistance comprises employing the starter motor resistance to estimate back-emf in accordance with the following relationships:

$$y(t)=\phi(t)\theta=V_B(t)-I_B\hat{R}_e$$

$$\phi(t)=N_{spd}, \theta=K_e$$

wherein $V_B(t)$ is a battery voltage,
$I_B$ is a battery current,
$\hat{R}_e$ is an estimate of the starter motor resistance,
$N_{spd}$ is a rotational speed of the starter motor, and
$K_e$ is the estimated back-emf.

3. The method of claim 2, wherein the estimated starter motor resistance for the starting event is determined in accordance with the following relationship:

$$\hat{R}_e = \frac{V_{min}}{I_p}$$

wherein $\hat{R}_e$ is the estimated starter motor resistance,
$V_{min}$ is a minimum starter voltage during the starting event, and
$I_p$ is a peak starter current during the starting event.

4. The method of claim 2, wherein employing the starter motor resistance to estimate back-emf further comprises applying a least-squares estimation routine to converge to the estimated back-emf for the battery current and the battery voltage during the engine starting event.

5. The method of claim 1, wherein determining the SOH of the starter motor comprises determining the state of health based upon a minimum SOH of a start/stop function availability SOH and a fault detection SOH, said minimum SOH adjusted based upon a ratio of a nominal engine cranking time and the measured engine cranking time.

6. The method of claim 5, wherein the start/stop function availability SOH is determined in accordance with the following relationship:

$$SOH_{start\_stop\_avail} = \min\left[\frac{\min(R_{nom}, \hat{R}_e)}{\max(R_{nom}, \hat{R}_e)}, \frac{K_e}{K_{e\_nom}}\right]$$

wherein $K_e$ is an estimated back-emf,
$K_{e\text{-}nom}$ is a nominal back-emf adjusted based upon a nominal starter motor resistance adjusted for starter motor temperature $T_{SM}$,
$R_{nom}$ is a nominal starter motor resistance, and
$\hat{R}_e$ is an estimate of the starter motor resistance.

7. The method of claim 5, wherein the fault detection SOH is determined in accordance with the following relationship:

$$SOH_{fault\_detection} = \min\left[\frac{\min(R_{adj\_nom}, \hat{R}_e)}{\max(R_{adj\_nom}, \hat{R}_e)}, \frac{K_e}{K_{e\_adj\_nom}}\right]$$

wherein $K_e$ is an estimated back-emf,
$K_{e\_adj\text{-}nom}$ is a nominal estimated back-emf adjusted for starter motor temperature,
$\hat{R}_e$ is an estimate of the starter motor resistance,
$R_{adj\_nom}$ is a nominal starter motor resistance adjusted for starter motor temperature.

8. The method of claim 7, wherein the nominal starter motor resistance adjusted for starter motor temperature is determined in accordance with the following relationship:

$$R_{adj\_nom}(T_{SM})=R_{nom}(1+\rho(T_{sm}-T_0))$$

wherein $R_{adj\_nom}(T_{SM})$ is the nominal starter motor resistance adjusted for a starter motor temperature $T_{SM}$,
$R_{nom}$ is the nominal starter motor resistance at a nominal temperature $T_0$, and
$\rho$ is a temperature-based resistivity coefficient.

9. The method of claim 7, wherein the nominal estimated back-emf adjusted for starter motor temperature is determined in accordance with the following relationship:

$$K_{e\_adj\_nom}(T_{SM})=K_{e\_nom}(1\beta(T_{SM}-T_0))$$

wherein $K_{e\_nom}$ is the nominal back-emf at a nominal temperature $T_0$,
$K_{e\_adj\_nom}(T_{SM})$ is the nominal back-emf at a starter motor temperature $T_{SM}$, and
$\beta$ is a temperature-based emf coefficient.

10. The method of claim 1, wherein controlling engine stop/start functionality based upon the SOH of the starter motor comprises disabling engine stop/start functionality for a present vehicle key-on cycle when the SOH of the starter motor is less than a first threshold SOH.

11. The method of claim 10, wherein controlling engine stop/start functionality based upon the SOH of the starter motor further comprises disabling engine stop/start functionality and alerting a vehicle operator when the SOH of the starter motor is less than a second threshold SOH, said second threshold SOH less than the first threshold SOH.

12. A method for monitoring a starter motor for an internal combustion engine configured to execute stop/start functions associated with autostop and autostart actions, comprising:
  determining starter motor resistance associated with an engine starting event;
  determining a back-emf for the starter motor based upon the starter motor resistance;
  determining a state of health (SOH) of the starter motor corresponding to the back-emf of the starter motor, a measured engine cranking time, and starter motor temperature; and
  disabling the engine stop/start functions for a present vehicle key-on cycle when the SOH of the starter motor is less than a first threshold SOH.

13. The method of claim 12, wherein determining the back-emf for the starter motor based upon the starter motor resistance comprises employing the starter motor resistance to estimate back-emf in accordance with the following relationships:

$$\phi(t)\theta=V_B(t)-I_B\hat{R}_e$$

$$\phi(t)=N_{spd}, \theta=K_e$$

wherein $V_B(t)$ is a battery voltage,
$I_B$ is a battery current,
$\hat{R}_e$ is an estimate of the starter motor resistance
$N_{spd}$ is a rotational speed of the starter motor, and
$K_e$ is the estimated back-emf.

14. The method of claim 13, wherein the estimated starter motor resistance for the starting event is determined in accordance with the following relationship:

$$\hat{R}_e = \frac{V_{min}}{I_p}$$

wherein $\hat{R}_e$ is the estimated starter motor resistance, $V_{min}$ is a minimum starter voltage during the starting event, and $I_p$ is a peak starter current during the starting event.

15. The method of claim 13, wherein employing the starter motor resistance to estimate back-emf further comprises applying a least-squares estimation routine to converge to the estimated back-emf for the battery current and the battery voltage during the engine starting event.

16. The method of claim 12, wherein determining the SOH of the starter motor comprises determining the state of health based upon a minimum SOH of a start/stop function availability SOH and a fault detection SOH, said minimum SOH adjusted based upon a ratio of a nominal engine cranking time for the starter motor temperature and the measured engine cranking time.

17. The method of claim 16, wherein the start/stop function availability SOH is determined in accordance with the following relationship:

$$SOH_{start\_stop\_avail} = \min\left[\frac{\min(R_{nom}, \hat{R}_e)}{\max(R_{nom}, \hat{R}_e)}, \frac{K_e}{K_{e\_nom}}\right]$$

wherein $K_e$ is an estimated back-emf, $K_{e\text{-}nom}$ is a nominal back-emf adjusted based upon a nominal starter motor resistance adjusted for starter motor temperature $T_{SM}$, $R_{nom}$ is a nominal starter motor resistance, and $\hat{R}_e$ is an estimate of the starter motor resistance.

18. The method of claim 16, wherein the fault detection SOH is determined in accordance with the following relationship:

$$SOH_{fault\_detection} = \min\left[\frac{\min(R_{adj\_nom}, \hat{R}_e)}{\max(R_{adj\_nom}, \hat{R}_e)}, \frac{K_e}{K_{e\_adj\_nom}}\right]$$

wherein $K_e$ is an estimated back-emf, $K_{e\_adj\_nom}$ is a nominal estimated back-emf adjusted for starter motor temperature, $\hat{R}_e$ is an estimate of the starter motor resistance, $R_{adj\_nom}$ is a nominal starter motor resistance adjusted for starter motor temperature.

19. The method of claim 18, wherein the nominal starter motor resistance adjusted for starter motor temperature is determined in accordance with the following relationship:

$$R_{adj\_nom}(T_{SM}) = R_{nom}(1 + \rho(T_{SM} - T_0))$$

wherein $R_{adj\_nom}(T_{SM})$ is the nominal starter motor resistance adjusted for a starter motor temperature $T_{SM}$, $R_{nom}$ is the nominal starter motor resistance at a nominal temperature $T_0$, and $\rho$ is a temperature-based resistivity coefficient.

20. The method of claim 18, wherein the nominal estimated back-emf adjusted for temperature is determined in accordance with the following relationship:

$$K_{e\_adj\_nom}(T_{SM}) = K_{e\_nom}(1 - \beta(T_{SM} - T_0))$$

wherein $K_{e\_nom}$ is the nominal back-emf at a nominal temperature $T_0$, $K_{e\_adj\_nom}(T_{SM})$ is the nominal back-emf at a starter motor temperature $T_{SM}$, and $\beta$ is a temperature-based emf coefficient.

* * * * *